United States Patent
Yu

(10) Patent No.: US 10,049,193 B2
(45) Date of Patent: Aug. 14, 2018

(54) SYSTEM FOR NEUTRALIZING MISAPPROPRIATED ELECTRONIC FILES

(71) Applicant: Bank of America Corporation, Charlotte, NC (US)

(72) Inventor: Sounil Yu, Reston, VA (US)

(73) Assignee: Bank of America Corporation, Charlotte, NC (US)

( * ) Notice: Subject to any disclaimer, the term of this patent is extended or adjusted under 35 U.S.C. 154(b) by 228 days.

(21) Appl. No.: 14/986,880

(22) Filed: Jan. 4, 2016

(65) Prior Publication Data

US 2017/0193203 A1 Jul. 6, 2017

(51) Int. Cl.
*G06F 21/00* (2013.01)
*G06F 21/12* (2013.01)

(52) U.S. Cl.
CPC .................................. *G06F 21/121* (2013.01)

(58) Field of Classification Search
CPC ............. H04L 63/145; H04L 29/12066; G06F 21/564; G06F 21/56; G06F 21/52; G06F 21/00; G06F 21/563; G06F 21/568
See application file for complete search history.

(56) References Cited

U.S. PATENT DOCUMENTS

| 2007/0079379 A1* | 4/2007 | Sprosts | G06Q 10/107 726/24 |
| 2008/0313704 A1* | 12/2008 | Sivaprasad | H04L 51/12 726/2 |
| 2012/0255014 A1* | 10/2012 | Sallam | G06F 21/554 726/24 |

* cited by examiner

*Primary Examiner* — Ghazal Shehni
(74) *Attorney, Agent, or Firm* — Michael A. Springs; Moore & Van Allen PLLC; Peter B. Stewart

(57) ABSTRACT

Disclosed is a computerized system for neutralizing misappropriated electronic files. The system typically includes a processor, a memory, and an electronic file neutralizing module stored in the memory. The system is typically configured for: determining that a first electronic file has been misappropriated; determining one or more identifying characteristics of the first electronic file; creating a second electronic file, wherein the second electronic file has different content than the first electronic file but comprises the one or more identifying characteristics of the first electronic file; and submitting the second electronic file to a third party providing a content inspection system that neutralizes malicious electronic documents.

20 Claims, 3 Drawing Sheets

SYSTEM FOR NEUTRALIZING MISAPPROPRIATED ELECTRONIC FILES

FIELD OF THE INVENTION

The present invention embraces a computerized system for neutralizing misappropriated electronic files. The system typically includes a processor, a memory, and an electronic file neutralizing module stored in the memory. The system is typically configured for: determining that a first electronic file has been misappropriated; determining one or more identifying characteristics of the first electronic file; creating a second electronic file, wherein the second electronic file has different content than the first electronic file but comprises the one or more identifying characteristics of the first electronic file; and submitting the second electronic file to a third party providing a content inspection system that neutralizes malicious electronic documents.

BACKGROUND

As the use and importance of electronic information systems has increased, the security threats to such systems have also increased. In particular, information stored in an information system may be misappropriated. Accordingly, a need exists for an improved way of neutralizing misappropriated electronic files.

SUMMARY

In one aspect, the present invention embraces a computerized system, and an associated method and computer program product, for neutralizing misappropriated electronic files. The system typically includes a processor and a memory. The system also typically includes an electronic file neutralizing module stored in the memory and executable by the processor. In one embodiment, the electronic file neutralizing module is configured for: determining that a first electronic file has been misappropriated; determining one or more identifying characteristics of the first electronic file; based on determining that the first electronic file has been misappropriated and determining one or more identifying characteristics of the first electronic file, creating a second electronic file, wherein the second electronic file has different content than the first electronic file but comprises the one or more identifying characteristics of the first electronic file; and submitting the second electronic file to a third party providing a content inspection system that neutralizes malicious electronic documents.

In a particular embodiment, the first electronic file is a non-executable electronic file and the second electronic file is an executable electronic file.

In another particular embodiment, the second electronic file is created to include characteristics of a malicious electronic file.

In yet another particular embodiment, the one or more identifying characteristics of the first electronic file comprise a first hash value computed using a hash function.

In yet another particular embodiment, the second electronic file has a second hash value that is equal to the first hash value, the second has value being computed using the hash function.

In yet another particular embodiment, the one or more identifying characteristics of the first electronic file comprise a name of an author of the first electronic file, a timestamp associated with the first electronic file, or a setting associated with the first electronic file.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
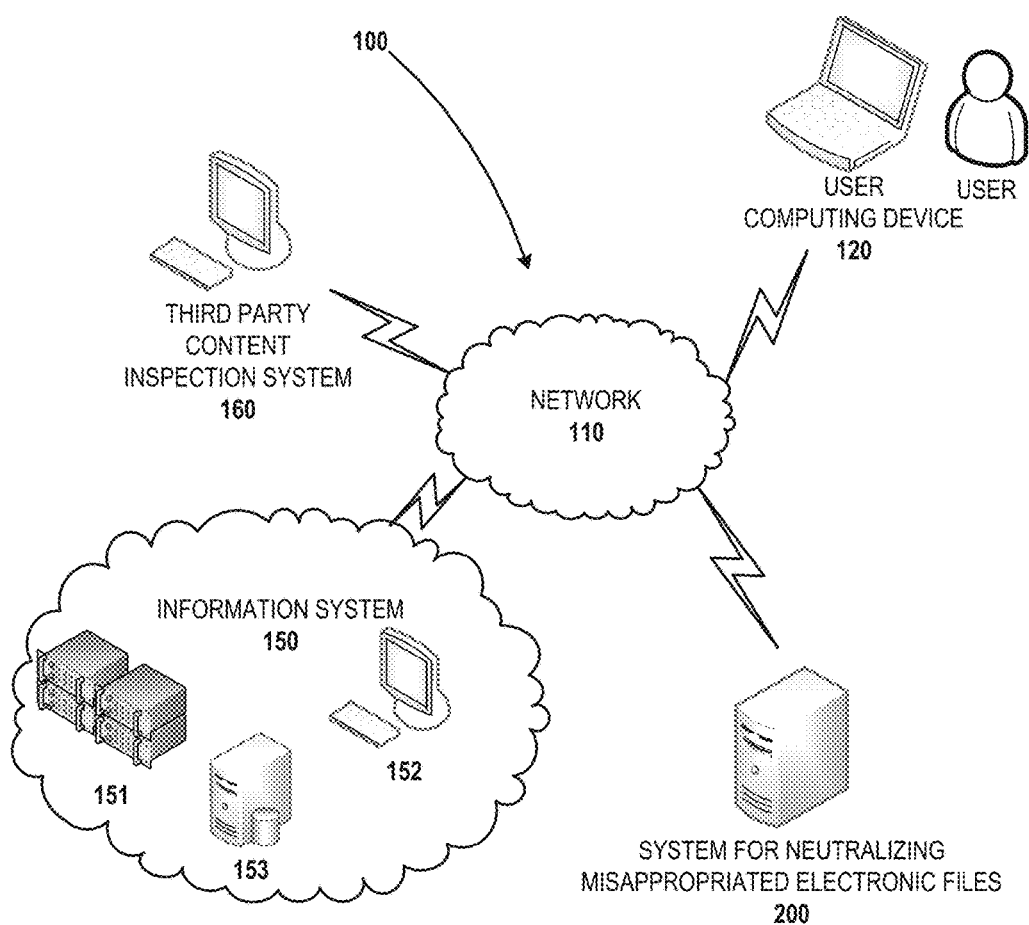
Figure 2:
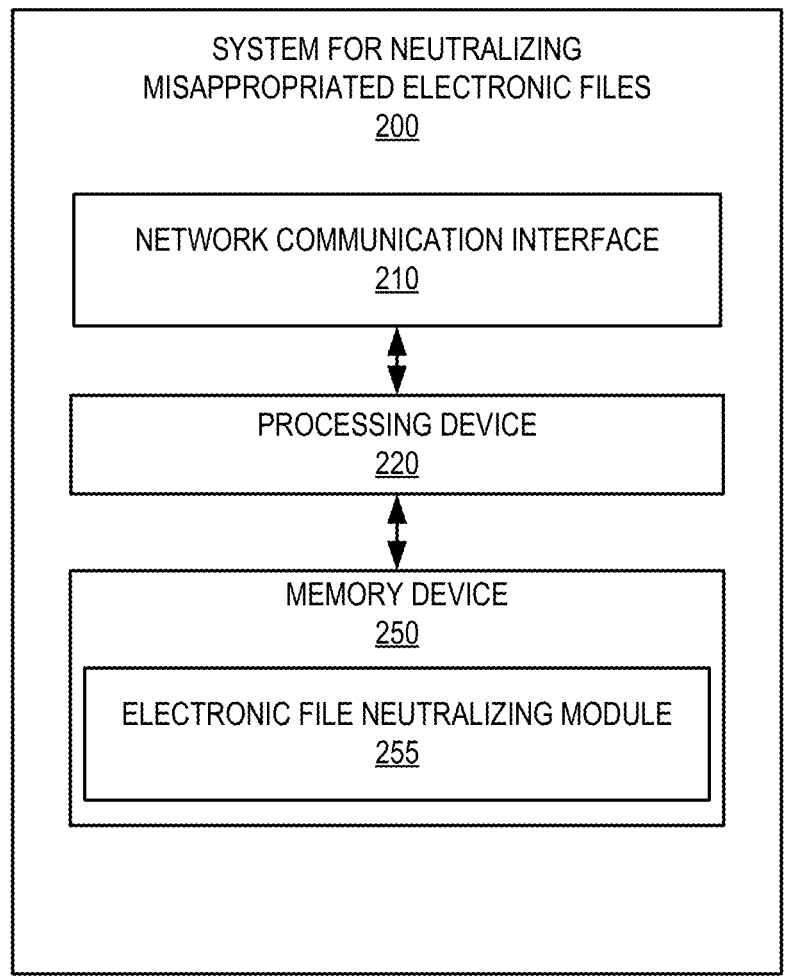
Figure 3:
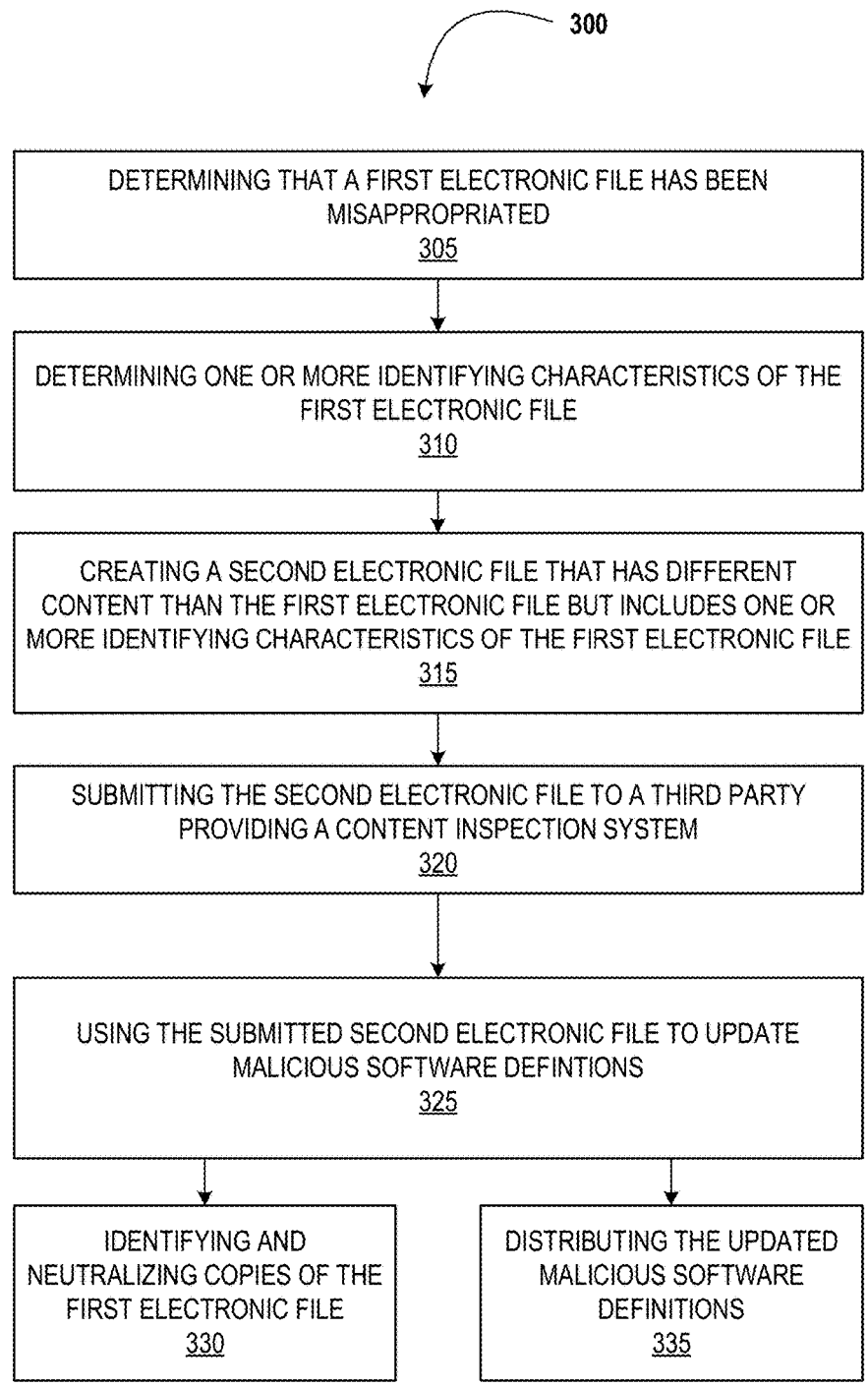

Having thus described embodiments of the invention in general terms, reference will now be made the accompanying drawings, wherein:

FIG. 1 depicts a system for neutralizing misappropriated electronic files and operating environment in accordance with an exemplary embodiment of the present invention;

FIG. 2 schematically depicts a system for neutralizing misappropriated electronic files in accordance with an exemplary embodiment of the present invention; and FIG. 3 depicts a method of neutralizing misappropriated electronic files in accordance with an exemplary embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

An "entity" may be any person or organization implementing a system for neutralizing misappropriated electronic files described herein. A "user" may be any person or entity using a system for neutralizing misappropriated electronic files described herein. Often, a user is an employee of the entity.

In one aspect, the present invention embraces a system that may be used to neutralize electronic files that have been misappropriated from an entity. One of the problems associated with neutralizing misappropriated electronic files, is that the entity is typically unable to locate and/or neutralize misappropriated electronic files located on computer systems that are not controlled by the entity. Accordingly, once the entity discovers that a sensitive electronic file has been misappropriated, the system may determine characteristics of the electronic file that may be used to identify the electronic file. The system will then typically create a second electronic file having some of the same identifying characteristics and then submit this second electronic file to a third party that provides content inspection software and/or services. Using the identifying characteristics of the second electronic file, the third party may then be able to use its software and/or services to locate and neutralize files with the same or similar identifying characteristics, including copies of the misappropriated electronic file.

FIG. 1 depicts an operating environment 100 according to one embodiment of the present invention. As depicted in FIG. 1, the operating environment 100 typically includes an information system 150 owned and/or operated by an entity. The information system 150 typically includes a plurality of devices, such as a server 151 and a workstation 152. The devices within the information system 150 may be configured to operate one or more applications that process information. The devices within the information system 150 are typically configured to communicate with one another, other devices operated by the entity, and devices operated by third parties (e.g., customers of the entity) via a network 110. The network 110 may be any type of network, such as the Internet, wide area network, local area network, Bluetooth® network, near field network, and/or any other form of contact or contactless network. Information received, processed, and/or created by the information system 150 may be stored in one or more databases 153. In some instances, sensitive information may be stored on one or more devices within the information system 150, such as in one or more of the databases 153. The information system 150 may include all devices, applications, and networks operated by the entity or may include a subset of such devices, applications, and networks.

The operating environment 100 also typically includes a system for neutralizing misappropriated electronic files 200. The system 200 may be in communication with one or more users, each having a user computing device 120, such as a PC, laptop, mobile phone, tablet, television, mobile device, wearable device, or the like (e.g., via the network 110). In some embodiments, the system 200 and/or user computing devices 120 may be part of the information system 150.

The system 200 is typically in communication (e.g., via the network 110) with one or more third party content inspection systems 160. Typically, each third party content inspection system 160 is configured to (i) identify and neutralize (e.g., quarantine and/or remove) malicious software located on computer systems in communication with the inspection system 160 (e.g., malicious software located on computer systems operated by customers of such third party) and/or (ii) update and distribute malicious software definitions for software distributed by such third party for identifying and neutralizing malicious software.

FIG. 2 depicts the system for neutralizing misappropriated electronic files 200 (also referred to as the "system 200") in more detail. As depicted in FIG. 2, the system 200 typically includes various features such as a network communication interface 210, a processing device 220, and a memory device 250. The network communication interface 210 includes a device that allows the system 200 to communicate with information system 150, user computing devices 120, and third party content inspection systems 160 (e.g., over the network 110 (shown in FIG. 1)).

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the system 200 is configured to assist in neutralizing electronic files that have been misappropriated from the entity. Accordingly, the system 200 typically includes one or more modules stored in the memory device 250, which assist in neutralizing misappropriated electronic files. As depicted in FIG. 2, the system 200 typically includes an electronic file neutralizing module 255.

In this regard, FIG. 3 depicts a method 300 of neutralizing electronic files that have been misappropriated from the entity aspects of which may be performed by the electronic file neutralizing module 255.

Initially, at block 305, the system 200 determines that a first electronic file has been misappropriated. For example, a third party may have gained unauthorized access to the information system 150 and used such unauthorized access to misappropriate a copy of the first electronic file, which may have been stored on one or more devices within the information system 150. By way of further example, a user (e.g., an employee) within the entity may have intentionally or inadvertently distributed the first electronic file to an unauthorized third party. The first electronic file may be any type of electronic file that contains any confidential, sensitive, or nonpublic information. For example, the first electronic file may be an electronic document that contains confidential information related to the entity.

Typically, the system 200 determines that the first electronic file has been misappropriated based on receiving on indication of such misappropriation from another entity device or system. For example, the entity may employ one or more security systems that monitor and/or analyze access to the information system 150. In some instances, such security systems may be configured to determine that an electronic file has been misappropriated and, if so, notify the system 200 of such misappropriation. In other instances, users of such security systems may analyze access logs or other reports generated by such security systems to determine that an electronic file has been misappropriated. Thereafter, a user may interact with the system 200 (e.g., via a user computing device 120) to provide an indication that such electronic file has been misappropriated. That said, it is within the scope of the present invention for the system 200 to deploy one or more security technologies to detect that the first electronic file has been misappropriated.

Based on determining that the first electronic file has been misappropriated, at block 310, the system 200 determines one or more identifying characteristics of the first electronic file. An identifying characteristic of the first electronic file may be any characteristic, artifact, trait, property, or the like of the first electronic file that may be used (either alone or in combination with other identifying characteristics) to identify the first electronic file. By way of example, an identifying characteristic of an electronic file may be the name of the author of the electronic file, a timestamp (e.g., the date the electronic file was created or last modified), a file size, a filename, the type of file, settings (e.g., language settings) associated with the electronic file, or the like. An identifying characteristic of an electronic file may also be a hash value of the electronic file computed using a hash function.

At block 315, the system 200 creates a second electronic file. The second electronic file is typically created to have one or more of the same identifying characteristics as the first electronic file. For example, the system 200 may generate the second electronic file so that it has the same author name, timestamp, and file size as the first electronic file. By way of further example, the system 200 may generate the second electronic file so that it has the same hash value using the same hash function as the first electronic file. In other words, the system 200 may generate the second electronic file so that the second electronic file and the first electronic file have a hash collision. In some embodiments, the system 200 may be configured to determine one or more predefined identifying characteristics of the first electronic file and then automatically create a second electronic file that has the same predefined identifying characteristics (e.g., the same author name, timestamp, and file size). In other embodiments, a user may interact with the system 200 (e.g., via a user computing device 120) to select one or more identifying characteristics of the first electronic file that should also be possessed by the second electronic file.

Although the first electronic file and the second electronic file possess some of the same identifying characteristics, the second electronic file is typically created to have different content than the first electronic file. For example, any confidential or sensitive information contained in the first electronic file might not be included in the second electronic file. In some embodiments, although the first electronic file is typically a non-executable electronic document, the second electronic file may be created so that the second electronic file is an executable file. In other embodiments, the second electronic file may be created so that it possesses characteristics of malicious software. In other words, although the second electronic file is not intended for malicious use, the second electronic file, nevertheless, may have characteristics of malicious software. By ensuring that the second electronic file has some different characteristics (e.g., content) than the first electronic file (but still has some of the same identifying characteristics), further distribution of confidential or sensitive information contained in the first electronic file or even an acknowledgement that misappropriation of confidential or sensitive information has occurred may be avoided.

Once the second electronic file has been created, at block 320, the second electronic file is submitted by the entity (e.g., using the system 200) to a third party that provides a content inspection system 160. In some instances, the content inspection system 160 provided by the third party may be configured to inspect content within a computer device, system, or network in order to identify and neutralize malicious software. In other words, the content inspection system 160 may provide hosted content inspection services for identifying and neutralizing malicious software on computer systems in communication with the content inspection system 160, such as computer systems operated by customers of such third party. In other instances, a third party may distribute content inspection software (e.g., antivirus or anti-malware software) that is configured to identify and neutralize malicious software. In such instances, the content inspection system 160 may be configured to update and distribute malicious software definitions or other rules used by the content inspection software distributed by the third party. The malicious software definitions may specify characteristics of known malicious software that can be used to identify malicious software and rules governing how the content inspection software may react to identifying particular malicious software. The malicious software definitions may be updated and distributed on a periodic basis as the third party identifies new malicious software or changes to existing malicious software. Although the third party may provide dedicated content inspection services and/or software, in other instances content inspection may be a function of a broader solution offered by the third party. For example, the third party may distribute productivity software that is configured to inspect electronic documents accessed by such software to identify and neutralize documents containing malicious software.

In some embodiments, along with submitting the second electronic file to a third party that provides a content inspection system, the submission to the third party may also specify certain identifying characteristics of the second electronic file, such as those common identifying characteristics of the first and second electronic files. In other words, the entity may specify what the identifying characteristics of the second electronic file should be.

At block 325, the third party may use the submitted second electronic file to update the malicious software definitions used by a content inspection system and/or content inspection software provided by the third party. In this regard, the third party may analyze the submitted second electronic file to determine identifying characteristics of the second electronic file and update the malicious software definitions to include such identifying characteristics. The third party may also use identifying characteristics specified by the entity when determining which identifying characteristics of the second electronic file to include in the updated malicious software definitions.

If the content inspection system 160 of the third party is configured to identify and neutralize malicious software, at block 330, the content inspection system 160 may inspect one or more computer systems (e.g., computer systems of customers of the third party) to identify and neutralize malicious software using the updated malicious software definitions. In this regard, the content inspection system 160 will typically search for software having the same or similar identifying characteristics of the submitted second electronic file. For example, the content inspection system 160 may search for software files having the same hash value. Because the second electronic file and the first electronic file have some of the same identifying characteristics, the content inspection system 160 may identify and neutralize copies of the first electronic file.

Alternatively, if the third party distributes content inspection software, the content inspection system 160 of the third party may distribute the updated malicious software definitions to users of such content inspection software (e.g., via the network 110). Thereafter, the content inspection software may inspect computer systems on which it is installed to identify and neutralize malicious software using the updated malicious software definitions. Accordingly, the content inspection software may search for software having identifying characteristics of the submitted second electronic file. Because the second electronic file and the first electronic file have some of the same identifying characteristics, the content inspection software may identify and neutralize copies of the first electronic file.

In an alternative embodiment, instead of creating a second electronic file that has some of the same identifying characteristics of the first electronic file, the entity may simply submit information regarding identifying characteristics of the first electronic file to a third party that provides a content inspection system. This submitted information may then be used by the third party to update malicious software definitions used by a content inspection system and/or content inspection software provided by the third party. Thereafter, the updated malicious software definitions may be used to identify and neutralize software having the same or similar identifying characteristics as the first electronic file.

As evident from the preceding description, the system described herein represents an improvement in technology by provided a way of neutralizing misappropriated electronic files. In this regard, the system will create an electronic file having some of the same identifying characteristics as a misappropriated electronic file and then submit this electronic file to a third party that provides a content inspection system or software. The third party's content inspection system or software may then identify and neutralize electronic files having the same or similar identifying characteristics, including copies of the misappropriated electronic file. Accordingly, by submitting electronic file to a third party that provides a content inspection system or software, the system described herein provides a technical solution for neutralizing misappropriated electronic files that are located on computer systems not controlled by the entity whose files have been misappropriated. Moreover, further distribution of confidential or sensitive information contained in the misappropriated electronic file may be avoided.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computerized system for neutralizing misappropriated electronic files, comprising:
   a computer apparatus including a processor, a memory, and a network communication device; and
   an electronic file neutralizing module stored in the memory, executable by the processor, and configured for:
      determining that a first third party obtained an unauthorized copy of a first electronic file, wherein the first electronic file is a non-executable electronic file that comprises confidential information of an entity;
      determining one or more identifying characteristics of the first electronic file, wherein the one or more identifying characteristics of the first electronic file comprise a name of an author of the first electronic file, a timestamp associated with the first electronic file, a setting associated with the first electronic file, or a first hash value;
      based on determining that the first third party obtained the unauthorized copy of the first electronic file and determining one or more identifying characteristics of the first electronic file that does not comprise the confidential information of the entity, creating a second electronic file, wherein the second electronic file has different content than the first electronic file but comprises the one or more identifying characteristics of the first electronic file, wherein the second electronic file is an executable electronic file; and
      submitting the second electronic file to a second third party providing a content inspection system that neutralizes malicious electronic software.

2. The computerized system for neutralizing misappropriated electronic files according to claim 1, wherein the second electronic file is created to include characteristics of a malicious electronic file.

3. The computerized system for neutralizing misappropriated electronic files according to claim 1, wherein the one or more identifying characteristics of the first electronic file comprise the first hash value, the first hash value being computed using a hash function.

4. The computerized system for neutralizing misappropriated electronic files according to claim 3, wherein the second electronic file has a second hash value that is equal to the first hash value, the second hash value being computed using the hash function.

5. The computerized system for neutralizing misappropriated electronic files according to claim 1, wherein the one or more identifying characteristics of the first electronic file comprise the name of an author of the first electronic file, the timestamp associated with the first electronic file, or the setting associated with the first electronic file.

6. The computerized system for neutralizing misappropriated electronic files according to claim 1, wherein the one or more identifying characteristics of the first electronic file comprise the name of an author of the first electronic file.

7. The computerized system for neutralizing misappropriated electronic files according to claim 1, wherein the one or more identifying characteristics of the first electronic file comprise the timestamp associated with the first electronic file.

8. The computerized system for neutralizing misappropriated electronic files according to claim 1, wherein the one or more identifying characteristics of the first electronic file comprise the setting associated with the first electronic file.

9. A computer program product for neutralizing misappropriated electronic files comprising a non-transitory computer-readable storage medium having computer-executable instructions for:
   determining that a first third party obtained an unauthorized copy of a first electronic file, wherein the first electronic file is a non-executable electronic file that comprises confidential information of an entity;
   determining one or more identifying characteristics of the first electronic file, wherein the one or more identifying characteristics of the first electronic file comprise a name of an author of the first electronic file, a timestamp associated with the first electronic file, a setting associated with the first electronic file, or a first hash value;
   based on determining that the first third party obtained the unauthorized copy of the first electronic file and determining one or more identifying characteristics of the first electronic file, creating a second electronic file that does not comprise the confidential information of the entity, wherein the second electronic file has different content than the first electronic file but comprises the one or more identifying characteristics of the first electronic file, wherein the second electronic file is an executable electronic file; and
   submitting the second electronic file to a second third party providing a content inspection system that neutralizes malicious electronic software.

10. The computer program product according to claim 9, wherein the second electronic file is created to include characteristics of a malicious electronic file.

11. The computer program product according to claim 9, wherein the one or more identifying characteristics of the first electronic file comprise the first hash value, the first hash value being computed using a hash function.

12. The computer program product according to claim 11, wherein the second electronic file has a second hash value that is equal to the first hash value, the second hash value being computed using the hash function.

13. The computer program product according to claim 9, wherein the one or more identifying characteristics of the first electronic file comprise the name of an author of the first electronic file, the timestamp associated with the first electronic file, or the setting associated with the first electronic file.

14. The computer program product according to claim 9, wherein the one or more identifying characteristics of the first electronic file comprise the name of an author of the first electronic file.

15. The computer program product according to claim 9, wherein the one or more identifying characteristics of the first electronic file comprise the timestamp associated with the first electronic file.

16. A method for neutralizing misappropriated electronic files, comprising:
determining, via a computer processor, that a first third party obtained an unauthorized copy of a first electronic file, wherein the first electronic file is a non-executable electronic file that comprises confidential information of an entity;
determining, via a computer processor, one or more identifying characteristics of the first electronic file, wherein the one or more identifying characteristics of the first electronic file comprise a name of an author of the first electronic file, a timestamp associated with the first electronic file, a setting associated with the first electronic file, or a first hash value;
based on determining that the first third party obtained the unauthorized copy of the first electronic file and determining one or more identifying characteristics of the first electronic file, creating, via a computer processor, a second electronic file that does not comprise the confidential information of the entity, wherein the second electronic file has different content than the first electronic file but comprises the one or more identifying characteristics of the first electronic file, wherein the second electronic file is an executable electronic file; and
submitting, via a computer processor, the second electronic file to a second third party providing a content inspection system that neutralizes malicious electronic software.

17. The method according to claim 16, wherein the second electronic file is created to include characteristics of a malicious electronic file.

18. The method according to claim 16, wherein the one or more identifying characteristics of the first electronic file comprise the first hash value, the first hash value being computed using a hash function.

19. The method according to claim 18, wherein the second electronic file has a second hash value that is equal to the first hash value, the second hash value being computed using the hash function.

20. The method according to claim 16, wherein the one or more identifying characteristics of the first electronic file comprise the name of an author of the first electronic file, the timestamp associated with the first electronic file, or the setting associated with the first electronic file.

* * * * *